(12) United States Patent
Lammers

(10) Patent No.: US 10,295,075 B2
(45) Date of Patent: May 21, 2019

(54) CYLINDER VALVE

(71) Applicant: CONTROL DEVICES, LLC, Fenton, MO (US)

(72) Inventor: Daniel A. Lammers, Fenton, MO (US)

(73) Assignee: Control Devices, LLC, Fenton, MO (US)

( * ) Notice: Subject to any disclaimer, the term of this patent is extended or adjusted under 35 U.S.C. 154(b) by 110 days.

(21) Appl. No.: 15/402,856

(22) Filed: Jan. 10, 2017

(65) Prior Publication Data

US 2018/0195630 A1 Jul. 12, 2018

(51) Int. Cl.
| F16K 17/38 | (2006.01) |
| F16K 15/02 | (2006.01) |
| F16K 27/02 | (2006.01) |
| F17C 13/04 | (2006.01) |

(52) U.S. Cl.
CPC .......... *F16K 17/383* (2013.01); *F16K 15/026* (2013.01); *F16K 27/0209* (2013.01); *F17C 13/04* (2013.01)

(58) Field of Classification Search
CPC ... F16K 17/383; F16K 15/026; F16K 27/0209
USPC .............................. 137/72–77; 220/582, 89.4
See application file for complete search history.

(56) References Cited

U.S. PATENT DOCUMENTS

| 2,186,923 A | 1/1940 | Hooper et al. |
| 2,629,458 A | 2/1953 | Allen et al. |
| 2,677,386 A | 5/1954 | Wilkerson |
| 2,999,509 A | 9/1961 | Hankison et al. |
| 3,203,245 A | 8/1965 | Smallpeice |
| 3,269,403 A | 8/1966 | Smallpeice |
| 3,275,020 A | 9/1966 | Fujiwara |
| 3,378,993 A | 4/1968 | Veres et al. |
| 3,418,789 A | 12/1968 | Hoffman et al. |
| 3,495,617 A | 2/1970 | Zifferer |
| 3,507,098 A | 4/1970 | Veres et al. |
| 3,980,457 A | 9/1976 | Smith |
| 3,992,941 A | 11/1976 | McGoldrick |
| 3,993,090 A | 11/1976 | Hankison |
| 4,082,107 A | 4/1978 | Hoffman et al. |
| 4,112,968 A | 9/1978 | Hoffman et al. |
| 4,136,009 A | 1/1979 | Samiran |

(Continued)

FOREIGN PATENT DOCUMENTS

| EP | 1130308 A2 | 9/2001 |
| EP | 2910867 A1 | 8/2015 |

(Continued)

*Primary Examiner* — P. Macade Nichols
(74) *Attorney, Agent, or Firm* — Stinson Leonard Street LLP

(57) ABSTRACT

A cylinder valve for use with a cylinder containing fluid under pressure. The cylinder valve has an aluminum valve body. The valve body has a flow passage extending through the valve body for permitting fluid to flow through the body to exit the cylinder and a vent passage for permitting fluid to vent from the cylinder. Nickel plating is applied to the vent passage. A dispensing valve is positioned along the flow passage. Thermal relief material in the vent passage blocks flow through the vent passage until a predetermined venting temperature is reached when the material changes to a flowable state to unblock the vent passage and allow venting of the cylinder through the vent passage.

17 Claims, 3 Drawing Sheets

(56) References Cited

U.S. PATENT DOCUMENTS

| | | | |
|---|---|---|---|
| 4,729,328 A | | 3/1988 | Shellenberger |
| 4,779,640 A | | 10/1988 | Cummings et al. |
| 4,823,827 A | | 4/1989 | Olejak |
| 5,014,735 A | | 5/1991 | Cummings |
| 5,103,855 A | | 4/1992 | Chuang |
| 5,115,798 A | | 5/1992 | Moore, Jr. et al. |
| 5,146,947 A | | 9/1992 | Vetrini |
| 5,365,969 A | | 11/1994 | Edwards |
| 5,511,576 A | * | 4/1996 | Borland ................ F16K 17/383 137/72 |
| 5,636,655 A | | 6/1997 | Kawamura et al. |
| 5,769,911 A | | 6/1998 | Van De Vijvere |
| 5,983,919 A | | 11/1999 | Ottinger et al. |
| 8,327,868 B2 | * | 12/2012 | Lammers ................ F16K 1/307 137/74 |
| 2007/0006918 A1 | | 1/2007 | Yamamoto |
| 2007/0137706 A1 | | 6/2007 | Stamatakis et al. |

FOREIGN PATENT DOCUMENTS

| | | | |
|---|---|---|---|
| FR | 2107774 A5 | 5/1972 | |
| GB | 1387750 A | 3/1975 | |
| JP | H1163388 A | 3/1999 | |

\* cited by examiner

CYLINDER VALVE

BACKGROUND

The present invention generally relates to cylinder valves, and more particularly to a cylinder valve having a thermal relief device.

Certain specialty gas cylinders require high pressure valves for selectively releasing pressurized gas from the cylinder. Some of these prior valves are made of brass, but when the valves are intended to be used with gases that react with brass, such as hydrogen sulfide, the brass valves are usually plated. For example, some brass valves are nickel-plated to protect the brass from the gas. The plating can become chipped, pitted, or otherwise damaged, allowing a reaction to occur between the gas and underlying brass.

Because the reaction between the gas and brass can alter the concentration and composition of the gas mixture in the cylinder, some conventional valve bodies are made of aluminum. One such conventional valve is designated in its entirety in FIG. 1 by the reference number 10. The valve 10 has an aluminum body 12 and a thermal relief device, generally designated by 14, mounted in a vent passage 16. The thermal relief device 14 includes an insert 20 having a plug 22 made of an alloy (i.e., solder) that melts at a predetermined temperature to allow gas to escape through the vent passage 16 should temperatures of the valve 10 or gas become too high. Because the solder does not easily or readily adhere to aluminum, the insert 20 is made of nickel-plated brass. The insert 20 presents a much smaller plated area that is exposed to the pressurized gas than a valve having a nickel-plated body. Further, the insert 20 is recessed in the body 12. Thus, the insert 20 has less opportunity to become damaged and to react with gas. One example of the aluminum valve is described in U.S. Pat. No. 8,327,868, which issued on Dec. 11, 2012, and is assigned to Control Devices, LLC, a Delaware corporation having a place of business in St. Louis, Mo.

Still, there is a need for an improved cylinder valve having a thermal relief device that does not include brass to entirely eliminate the potential for a reaction to occur between the valve and gas in the cylinder.

SUMMARY

In one aspect, a cylinder valve is used with a cylinder containing fluid under pressure. The cylinder valve comprises an aluminum valve body configured for releasably connecting to the cylinder. The valve body has an inner end facing the cylinder when the valve body is connected to the cylinder, and an outer end opposite the inner end. A flow passage extends through the valve body from the inner end to the outer end for permitting fluid to flow through the body to exit the cylinder when the valve body is connected to the cylinder. Further, A vent passage extends through the valve body separate from the flow passage for permitting fluid to vent from the cylinder when the valve body is connected to the cylinder; nickel plating applied to the valve body over an area defining the vent passage. The cylinder valve includes a dispensing valve positioned along the flow passage and movable between an open position in which fluid is free to flow through the flow passage and a closed position in which fluid is blocked from flowing through the flow passage. In addition, the cylinder valve comprises thermal relief material in the vent passage blocking flow through the vent passage until a predetermined venting temperature is reached. When the predetermined temperature is reached, the thermal relief material changes from a solid state to a flowable state to unblock the vent passage and allow venting of the cylinder through the vent passage.

In another aspect, an assembly comprises a cylinder containing a pressurized gaseous mixture including a calibration gas. The assembly includes a cylinder valve installed on the cylinder. The cylinder valve comprises a valve body releasably connecting to the cylinder. The valve body has an inner end facing the cylinder when the valve body is connected to the cylinder, and an outer end opposite the inner end. A flow passage extends through the valve body from the inner end to the outer end for permitting fluid to flow through the body to exit the cylinder when the valve body is connected to the cylinder. A vent passage extends through the valve body separate from the flow passage for permitting fluid to vent from the cylinder when the valve body is connected to the cylinder. The valve body does not comprise brass. The cylinder valve includes plating applied to the valve body on an area defining the vent passage. A dispensing valve is positioned along the flow passage and movable between open in which fluid is free to flow through the flow passage and a closed position in which fluid is blocked from flowing through the flow passage; and thermal relief material in the vent passage blocking flow through the vent passage until a predetermined venting temperature is reached whereupon the thermal relief material changes from a solid state in which the pressurized gaseous mixture flows past the thermal relief material to unblock the vent passage and allow the cylinder to vent through the vent passage.

In another aspect, a cylinder valve is used with a cylinder containing fluid under pressure. The cylinder valve comprises a valve body configured for releasably connecting to the cylinder. The valve body has an inner end facing the cylinder when the valve body is connected to the cylinder, and an outer end opposite the inner end. A flow passage extends through the valve body from the inner end to the outer end for permitting fluid to flow through the body to exit the cylinder when the valve body is connected to the cylinder. A vent passage extends through the valve body separate from the flow passage for permitting fluid to vent from the cylinder when the valve body is connected to the cylinder. The valve body does not comprise brass and has plating applied over an exterior of the body and the vent passage. The cylinder valve also comprises a dispensing valve positioned along the flow passage and movable between an open position in which fluid is free to flow through the flow passage and a closed position in which fluid is blocked from flowing through the flow passage. Further, the cylinder includes thermal relief material in the vent passage blocking flow through the vent passage until a predetermined venting temperature is reached whereupon the thermal relief material changes from a solid state to a flowable state to unblock the vent passage and allow venting of the cylinder through the vent passage.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
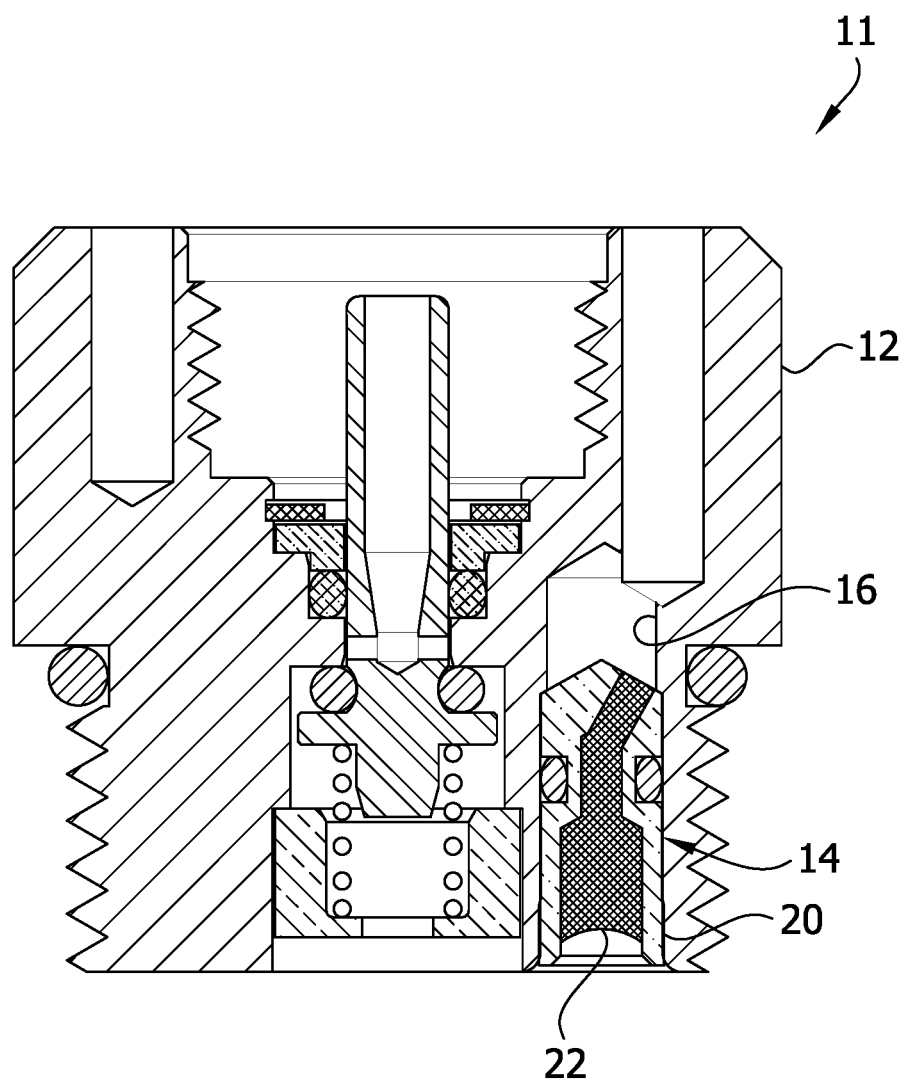
FIG. 1 is a cross section of a conventional cylinder valve.
Figure 2:
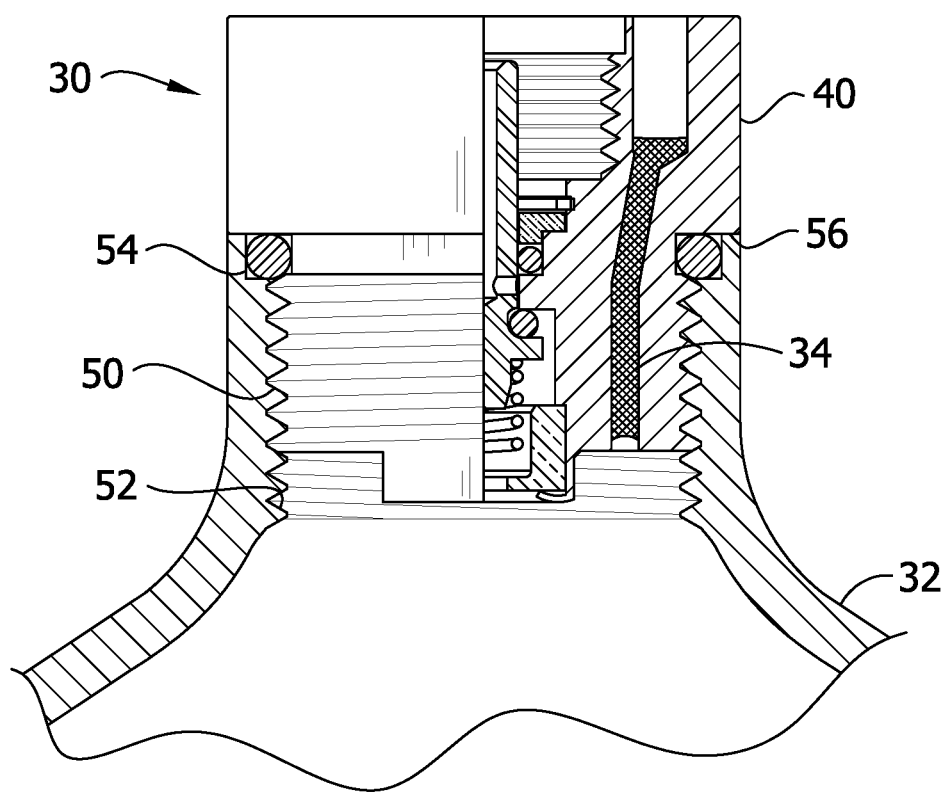
FIG. 2 is a partial cross section of a cylinder valve and cylinder as described below.

Referring now to the drawings, and in particular FIG. 2, a cylinder valve is designated in its entirety by the reference numeral 30. The valve 30 is shown mounted on a cylinder 32 containing a mixture of gases under pressure. The cylinder valve 30 has a thermal relief material 34 for venting gas from the cylinder 32 in the event a temperature of the cylinder valve and/or gas inside the cylinder rises above a predetermined temperature.

Figure 3:
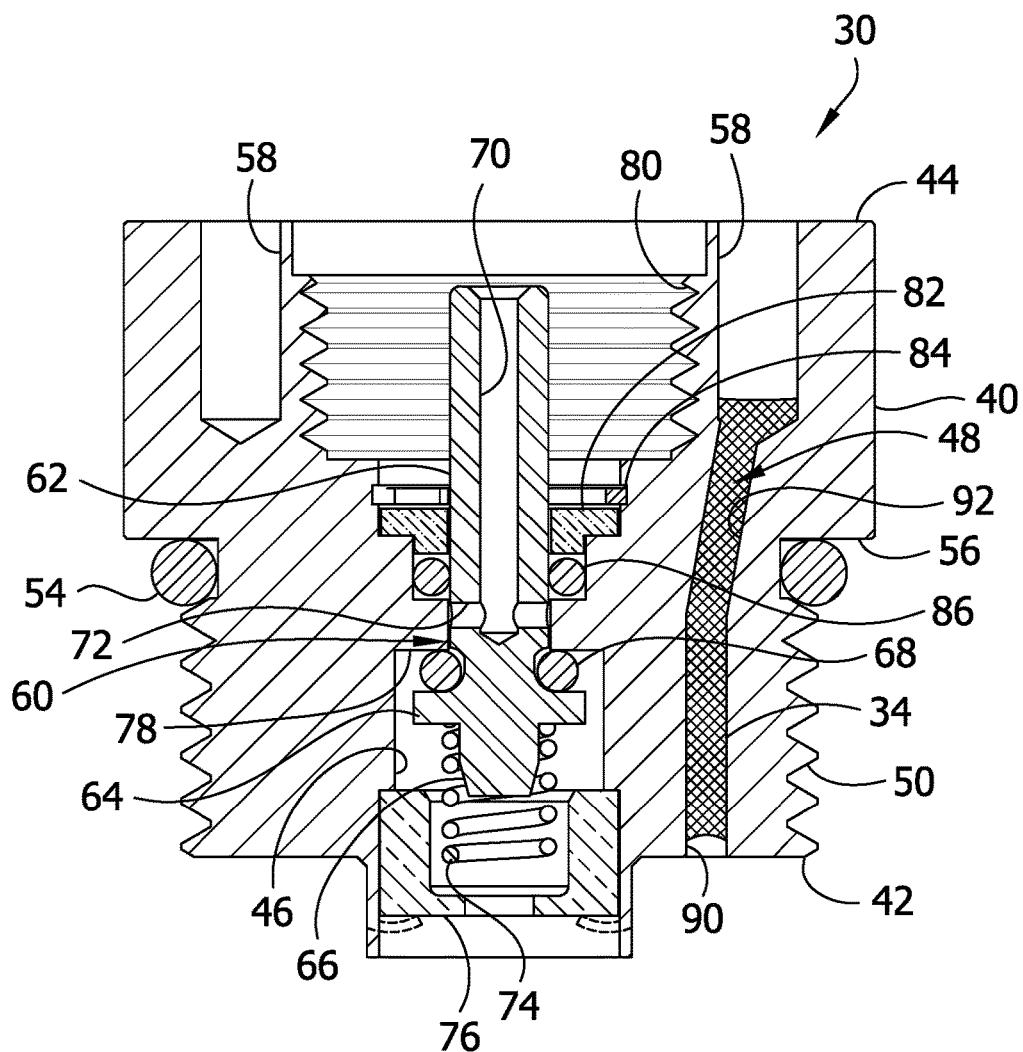
FIG. 3 is an enlarged cross section of the cylinder valve of FIG. 2.

Referring to FIGS. 2 and 3, the cylinder valve 30 includes a valve body 40 having an inner end 42 facing the cylinder when the valve body is connected to the cylinder and an outer end 44 opposite the inner end. A flow passage 46 extends through the valve body from the inner end 42 to the outer end 44 for permitting fluid (e.g., pressurized gas) to flow through the body to exit the cylinder 32 when the valve body is connected to the cylinder. A vent passage, generally designated by 48, extends through the valve body 40 separate from the flow passage 46 for permitting fluid to vent from the cylinder 32 when the valve body is connected to the cylinder. The valve body 40 has external threads 50 adjacent the inner end 42 that engage internal threads 52 (FIG. 2) of the cylinder 32 to provide a selectively releasable connection between the valve body and the cylinder. The connection is sealed by a seal 54 (e.g., an O-ring) seated against an exterior shoulder 56 on the valve body 40. Openings 58 are provided on the outer end 44 of the cylinder valve 30 for receiving a conventional spanner wrench (not shown) to turn the cylinder valve when connecting and disconnecting the valve to and from the cylinder 32. Although the valve body 40 may be made of other non-brass or non-reactive materials, in one example the body is made of aluminum.

As further illustrated in FIG. 3, a dispensing valve, generally designated by 60, is mounted in the flow passage 48 and is movable between an open position, in which fluid is free to flow through the flow passage, and a closed position, in which fluid is blocked from flowing through the flow passage. The dispensing valve 60 comprises a hollow cylindrical stem 62 extending along a central axis of the flow passage 48. A flange 64 is formed at an inward end of the stem 62 and a hub 66 extends from the flange opposite the stem. A valve seal 68 (e.g., an O-ring) is positioned adjacent the flange 64. In the illustrated example, the stem 62, flange 64, and hub 66 are one piece, but it is envisioned they could be separate pieces. Further, in one example, the stem 62, flange 64, and hub 66 are made of stainless steel. The stem 62 has a longitudinal opening 70 extending from an outer end of the stem to a transverse opening 72 near the valve seal 68. A coil spring 74 is mounted on the hub 66 and seated in a spring retainer 76 at the inner end of the flow passage 48. In one example, the retainer 76 is held in the flow passage 48 by deforming an end of the valve body 40 as indicated by dashed lines in FIG. 3. The spring 74 pushes the dispensing valve 60 toward a closed position in which the valve seal 68 seats against a valve seat 78 formed by an internal shoulder in the flow passage 48. When the dispensing valve 60 is in this closed position fluid flow through the passage is blocked. As will be appreciated by those skilled in the art, when the stem 62 is pushed toward the cylinder 32, the spring 74 compresses, allowing the seal 68 to move away from the valve seat 78 and the transverse passage 72 to extend past the valve seat 78. With the stem 62 in this position, the dispensing valve 60 is open and fluid is free to flow around the flange 64 and past the seal 68 to enter the transverse opening 78 and flow through the longitudinal opening 70. As will be appreciated by those skilled in the art, the stem 62, flange 64, and hub 66 form a poppet and the dispensing valve is a poppet valve.

An upper end of the central flow passage 48 has internal threads 80 for engaging external threads on a flow regulator (not shown). The configuration is such that when the regulator is threaded into its operating position on the cylinder valve 30, the stem 62 of the dispensing valve 60 is pushed toward the open position in which the valve seal 68 is spaced from of the valve seat 78 and the transverse opening 72 in the stem communicates with the central flow passage 46 of the cylinder valve to permit flow of gas from the cylinder 32. An annular guide member 82 is provided to center the valve stem 62 in the central flow passage 48. In one example, the guide member 82 is held in position by a retaining ring 84. A sealing member 86 (e.g., an O-ring) adjacent the guide member 82 seals against the outside cylindrical surface of the valve stem 62.

As shown in FIG. 3, the vent passage 48 extends through the valve body 40 from the inner end 42 of the valve body to the outer 44 of the valve body generally beside the central flow passage 48 but separate from the central flow passage. The vent passage 90 has an inner section 90. One of the spanner openings 58 forms an outer section of the vent passage. An angled middle section 92 connects the inner section 92 to the spanner opening 58.

As mentioned above, thermal relief material 34 fills at least a portion of the vent passage 48. In the illustrated example, the thermal relief material 34 fills the inner section 90 of the vent passage 48. The material 34 blocks flow through the vent passage 48 until the material reaches a predetermined venting temperature. When the material reaches that temperature, the thermal relief material 34 changes from a solid state to a flowable state to unblock the vent passage 48 and allow the cylinder 32 to vent through the vent passage. In one example, the temperature relief material 34 is a solder made of bismuth, tin, and lead and has a nominal melting temperature of 212° F. In this example the material 34 is adapted to be bubble tight for one minute at 1300 psi and to withstand 24 hours at 1300 psi and 150° F. In another example, the material 34 is a solder having a melting temperature in the range of 151° F.-218° F. In some examples, the solder is adapted to remain solid and withstand pressure over a range of temperatures from about −40° F. to about 130° F. Further, the solder conforms with Compressed Gas Association standards for a type CG-9 relief device.

As previously mentioned, rather than being made of brass, the valve body 40 is made of a non-reactive material such as aluminum. (As used herein, a material is "non-reactive" if there is no change in the chemical composition or concentration of calibration gas when it contacts the material. Conversely, a material is "reactive" if there is a change in the chemical composition or concentration of the calibration gas when it contacts the material.) Aluminum is non-reactive with hydrogen sulfide, but brass is reactive with hydrogen sulfide. To ensure that the thermal relief material 34 bonds to the body 40, the body is plated with nickel. In one example, the plating is accomplished using a conventional electroless plating process.

Solder does not easily or readily adhere to aluminum. Accordingly, when solder is used as the thermal relief material, the aluminum valve body 40 is plated to ensure the solder adheres to this material. Although only a portion of the valve body 40 contacting the solder (e.g., the inner section 92) need be plated, in one example the entire body is plated. Even if the plating on other parts of the valve body 40 is damaged, the underlying aluminum will not react with the certification gas. Thus, unlike prior designs which included brass parts, the cylinder valve 30 described above has no brass and will not react with the certification gas.

In use, the cylinder valve 30 is connected to the cylinder 32, and a regulator is connected to the cylinder valve to move the dispensing valve 60 to its open position. In the event the temperature of the cylinder 32 and/or gases inside the cylinder exceeds the melting temperature of the thermal relief material 34, the material will flow and allow the cylinder 32 to vent through the vent passage 48, relieving pressure in the cylinder. During use, the risk of a reaction between cylinder valve 30 and the calibration gas in the cylinder 32 is eliminated because the valve is made of non-reactive material.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cylinder valve for use with a cylinder containing fluid under pressure, said cylinder valve comprising:
    an aluminum valve body configured for releasably connecting to the cylinder, said valve body having an inner end facing the cylinder when the valve body is connected to the cylinder, an outer end opposite the inner end, a flow passage extending through the valve body from the inner end to the outer end for permitting fluid to flow through the body to exit the cylinder when the valve body is connected to the cylinder, and a vent passage extending through the valve body separate from the flow passage for permitting fluid to vent from the cylinder when the valve body is connected to the cylinder;
    nickel plating applied to the valve body over an area defining the vent passage;
    a dispensing valve positioned along the flow passage and movable between an open position in which fluid is free to flow through the flow passage and a closed position in which fluid is blocked from flowing through the flow passage; and
    thermal relief material in the vent passage blocking flow through the vent passage until a predetermined venting temperature is reached whereupon said thermal relief material changes from a solid state to a flowable state to unblock the vent passage and allow venting of the cylinder through said vent passage.

2. The cylinder valve as set forth in claim 1 wherein said thermal relief material comprises solder.

3. The cylinder valve as set forth in claim 2 wherein said solder comprises bismuth, tin, and lead.

4. The cylinder valve as set forth in claim 1 wherein said thermal relief material blocks fluid flowing through the flow passage for at least 24 hours under a pressure of 1300 psi and a temperature of 150° F.

5. The cylinder valve as set forth in claim 1 wherein the nickel plating covers all of the body.

6. The cylinder valve as set forth in claim 1 wherein the nickel plating comprises electroless nickel plating.

7. The cylinder valve as set forth in claim 1 wherein the dispensing valve comprises a poppet and a spring biasing the poppet toward the closed position.

8. An assembly comprising:
    a cylinder containing a pressurized gaseous mixture including a calibration gas; and
    a cylinder valve installed on the cylinder, said cylinder valve comprising:
    a valve body releasably connecting to the cylinder, said valve body having an inner end facing the cylinder when the valve body is connected to the cylinder, an outer end opposite the inner end, a flow passage extending through the valve body from the inner end to the outer end for permitting fluid to flow through the body to exit the cylinder when the valve body is connected to the cylinder, and a vent passage extending through the valve body separate from the flow passage for permitting fluid to vent from the cylinder when the valve body is connected to the cylinder, wherein said valve body does not comprise brass;
    plating applied to the valve body on an area defining the vent passage;
    a dispensing valve positioned along the flow passage and movable between open in which fluid is free to flow through the flow passage and closed positions in which fluid is blocked from flowing through the flow passage; and
    thermal relief material in the vent passage blocking flow through the vent passage until a predetermined venting temperature is reached whereupon said thermal relief material changes from a solid state in which the pressurized gaseous mixture flows past the thermal relief material to unblock the vent passage and allow the cylinder to vent through said vent passage;
    wherein the plating comprises nickel.

9. The assembly as set forth in claim 8 wherein the valve body comprises aluminum.

10. The assembly valve as set forth in claim 8 wherein said thermal relief material comprises bismuth, tin, and lead.

11. The assembly valve as set forth in claim 8 wherein said thermal relief material blocks fluid flowing through the flow passage for at least 24 hours under a pressure of 1300 psi and a temperature of 150° F.

12. The assembly valve as set forth in claim 8 wherein the nickel plating is applied to all of the valve body.

13. The assembly valve as set forth in claim 8 wherein the dispensing valve comprises a poppet and a spring biasing the poppet toward the closed position.

14. The assembly valve as set forth in claim 9 wherein said thermal relief material comprises solder.

15. A cylinder valve for use with a cylinder containing fluid under pressure, said cylinder valve comprising:
    a valve body configured for releasably connecting to the cylinder, said valve body having an inner end facing the cylinder when the valve body is connected to the cylinder, an outer end opposite the inner end, a flow passage extending through the valve body from the inner end to the outer end for permitting fluid to flow through the body to exit the cylinder when the valve body is connected to the cylinder, and a vent passage extending through the valve body separate from the flow passage for permitting fluid to vent from the cylinder when the valve body is connected to the cylinder, wherein said valve body does not comprise brass and has plating applied over an exterior of the body and the vent passage;

a dispensing valve positioned along the flow passage and movable between an open position in which fluid is free to flow through the flow passage and a closed position in which fluid is blocked from flowing through the flow passage; and thermal relief material in the vent passage blocking flow through the vent passage until a predetermined venting temperature is reached whereupon said thermal relief material changes from a solid state to a flowable state to unblock the vent passage and allow venting of the cylinder through said vent passage;

wherein the plating comprises nickel.

16. The cylinder valve as set forth in claim 15 wherein the valve body comprises aluminum.

17. The cylinder valve as set forth in claim 15 wherein said thermal relief material comprises solder.

\* \* \* \* \*